[11] 3,626,144

| [72] | Inventors | Marcel Boncoeur<br>Paris;<br>Jean-Yves Marhic, Fresnes; Michel Rapin,<br>Paris, all of France |
|---|---|---|
| [21] | Appl. No. | 869,199 |
| [22] | Filed | Oct. 24, 1969 |
| [45] | Patented | Dec. 7, 1971 |
| [73] | Assignee | Commissariat a l'Energie Atomique<br>Paris, France |
| [32] | Priority | Oct. 25, 1968 |
| [33] | | France |
| [31] | | 171534 |

[54] METHOD OF ADJUSTMENT OF FOCUSING IN ELECTRON BEAM WELDING
2 Claims, 5 Drawing Figs.

[52] U.S. Cl. ................................................. 219/121 EM
[51] Int. Cl. ........................................................ B23k 15/00
[50] Field of Search ........................................... 219/121, 121 EB; 250/41.9, 49.5

[56] References Cited
UNITED STATES PATENTS

| 3,054,896 | 9/1962 | Jones et al. ................ | 250/41.9 |
| 3,148,265 | 9/1964 | Hansen ...................... | 219/117 |
| 3,291,959 | 12/1966 | Schleich et al. ........... | 219/121 |
| 3,389,382 | 6/1968 | Hart et al. .................. | 340/173 |
| 3,426,174 | 2/1969 | Graham et al. ............ | 219/121 |

*Primary Examiner*—J. V. Truhe
*Assistant Examiner*—Robert E. O'Neill
*Attorney*—Craig, Antonelli and Hill

ABSTRACT: Method for reproducing welding conditions with respect to an electron beam welding arrangement wherein, with beam acceleration and the physical parameters of the arrangement maintained constant, the values of target current versus focusing current are recorded as the focusing current is varied over a range, and then, at a later time when the same weld is desired for a particular value of focusing, the focusing current is first adjusted until a peak in the target current is reached which corresponds to a peak previously recorded and the focusing current is further adjusted by a value which is equal to the difference between the initial target currents for the range as recorded and newly measured.

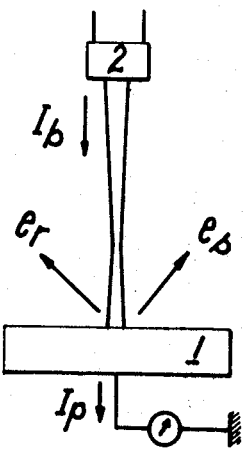
FIG.1  $I_b - (I_r + I_s)$
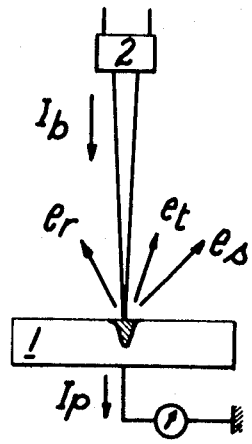
FIG.2  $I_b - (I_r + I_s + I_t)$
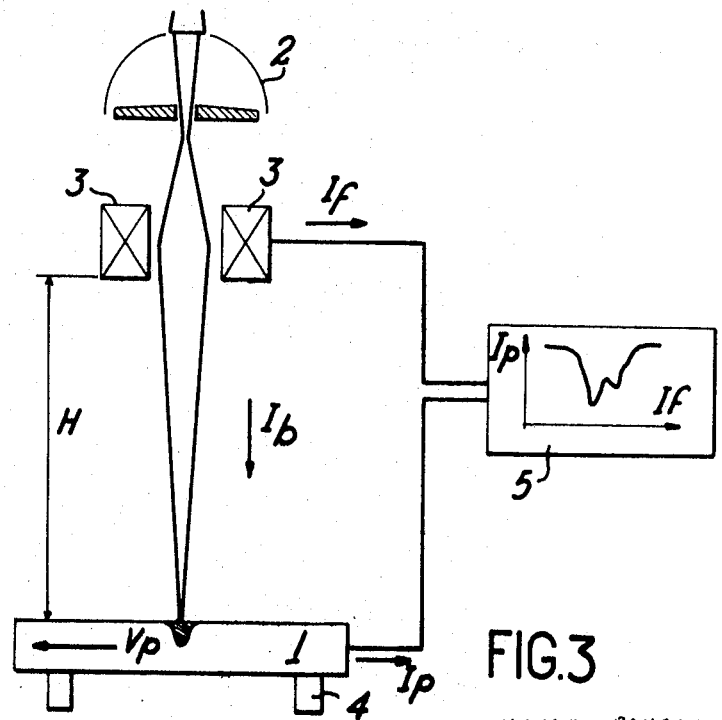
FIG.3
INVENTORS
MARCEL BONCOEUR, JEAN-YVES MARHIC
and MICHEL RAPIN

METHOD OF ADJUSTMENT OF FOCUSING IN ELECTRON BEAM WELDING

The present invention relates to a method for adjustment of the focusing in electron beam welding and also for indication of the different welding parameters.

An important problem which arises in the electron beam welding process is the possibility of reproducing a weld having predetermined properties. In order to carry out two identical welds at two separate times by means of the same electron gun, the different welding parameters must be reproduced with accuracy. In particular, it is essential to ensure that the focused portion of the beam should again take up the same position with respect to the surface of the sample to be treated forming the target. In point of fact, the properties of the electron gun vary rapidly in time; and in the case of single focused stream which flows through an electromagnetic focusing coil, the focused portion of the beam may not always occupy the same position in which case the welds obtained at different times are different. It is therefore not sufficient to reset the electron gun in the same position with respect to the target, but the position of the focused portion of the beam must also be located with precision.

According to a method of the prior art, it has been proposed to experimentally and empirically position the focused portion of the beam on the surface of the sample to be welded. To this end, the experimenter produces a line of fusion on a target having a composition which is identical with that of the part to be welded. The vapors which are given off by the molten metal are ionized by the electron beam which becomes colored and therefore visible. The experimenter then modifies the focusing current so as to bring the focused portion of the beam into the proper position on he surface of the target.

A method of this type is empirical and is of varying accuracy according to the skill of the experimenter, the nature of the metal to be welded, the power employed for welding and other factors, with the result that the reproducibility of welds is uncertain.

The present invention overcomes the disadvantages which have just been mentioned and makes it possible to adjust the focusing from a graphic recording and is based on the principle which will be set forth hereinafter.

If an electron beam in which all the properties other than focusing are assumed to be invariable strikes a metallic target of known composition, said target is liable to become heated or to remain at the ambient temperature depending on the rate of cooling and on the energy level of the electrons which are emitted by the gun.

If the conditions are such that the target does not become heated, the incident electrons strike the target and penetrate into the metal; some electrons remain fixed in the metal and others escape, namely the high-energy backscattered electrons and the secondary electrons having an energy which is lower than 50 ev.

FIG. 1 summarizes these conditions and shows that the current $I_p$ which passes through the part 1 is equal to the difference between the incident current $I_b$ of the beam delivered by the electron gun 2 and the currents $I_s$ and $I_r$ which result from the secondary electrons $e_s$ and from the backscattered electrons $e_r$; we therefore have $$I_p = I_b - (I_s + I_r)$$

Experience has shown that the current $I_p$ remains practically constant irrespective of the focusing current.

On the contrary, if the conditions are such that the target becomes heated and melts under the impact of the electrons issuing from the gun, said target becomes a thermoelectric emitter and emits thermal electrons $e_t$ of low energy which pass out of the metal (as shown in FIG. 2). The value of the current within the part 1 is in this case as follows:

$$I_p = I_b - (I_r + I_s + I_t),$$

wherein $I_t$ is the thermal electron current and $I_r$ is equal to $\eta I_b$, wherein $\eta$ is the back-scattering factor in the case of the metal considered.

The thermoelectric emission is governed by the Richardson-Dushmann law whereby the thermal electron current varies with the temperature and the surface area of the emitting target in the case of a given metal. In point of fact, it is known that the depth and the width of the molten zone and therefor the emissive surface as well as the temperature of the liquid bath vary with the focusing of the electron beam. In consequence $I_t$ is a function of this focusing.

Moreover, $I_r$ and $I_s$ vary with the shape, the state of surface of the target curve the incidence of the electrons; since the surface of the target is continuously deformed under the impact of the electrons and has an area which varies according to the focusing of the beam, it accordingly follows that $I_s$ and $I_r$ are also a function of the focusing.

In the final analysis, the intensity $I_p$ must be a function of the focusing current $I_f$ and experience his shown that this is in fact the case.

The object of this invention is to produce a record of the curve $I_p = f(I_f)$.

In particular, the present invention relates to a method of adjustment of focusing in the electron beam welding process. This method consists in recording the curve $I_p = f(I_f)$ under the welding condition which is chosen, that is to say with well defined values of the welding parameters and in particular of the rate of variation of the focusing current, in indicating the values of the focusing current on the one hand in respect of one of the characteristic peaks of said curve and on the other hand in respect of the first weld which is performed, in plotting the curve again under the same conditions for the purpose of reproducing the weld, in indicating the focusing current of the characteristic peak which is chosen and in defocusing the beam by varying the focusing current by a value which is equal to the difference between the two currents noted at the time of the initial weld.

Further properties and advantages of the present invention will be brought out by the following description in which one form of execution of the invention is given by way of explanation but not in any sense by way of limitation, reference being made to the accompanying drawings, in which:

FIGS. 1 and 2 show diagrammatically as explained in the foregoing the distribution of the different currents respectively in the case in which the target does not become heated and in the case in which said target melts under the impact of the electrons emitted by the gun;

FIG. 3 shows diagrammatically a focusing adjustment device for carrying out the method according to the invention;

Figure 4:
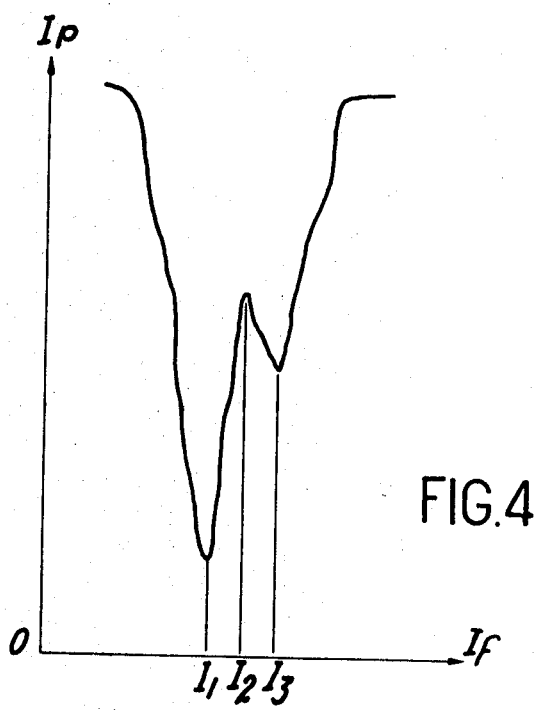
FIG. 4 shows a curve of variation of the current $I_p$ which flows through the target as a function of the focusing current $I_f$.

In FIG. 3, the device of known type which is employed in the electron beam welding process comprises a recorder 5 which is intended to plot the curve of $I_p$ as a function of $I_f$. This device comprises in known manner a focusing coil 3; the reference numeral 4 designates an insulator. The electron gun employed in this case is of the Pierce type.

The bombardment current $I_b$, the electron acceleration voltage U, the distance H between the part 1 and the electron gun 2 as well as the welding speed $V_p$, are maintained constant; the focusing current $I_f$ is caused to vary at a constant rate and the curve $I_p = f(I_p)$ is recorded in the recorder 5; it is noted in FIG. 4 that the current $I_p$ varies continuously as a function of $I_f$.

The curve of FIG. 4 has been obtained in respect of the following values of the different parameters: $I_b = 100$ ma., U=26.5 kv., $V_p = 36$ mm./min. and H=9.5 cm., the treated part being formed of mild steel.

In the case of a target having a given composition and shape and in the case of constant values of parameters of the beam other than focusing, the curve obtained in the recorder 5 is always the same to within a few units percent and the summits of the peaks correspond to practically fixed values which are characteristic of the focusing current $I_f$; the variation s in abscissae under the conditions of experiments performed always prove to be less than 1 percent.

It has been proved in the course of tests that there is a correlation between the dimensions of the welds and the curves obtained on the recorder 5.

Thus, the curve $I_p=f(I_f)$ is plotted in respect of a zero rate of variation of $I_f$, namely point by point. Lines of fusion are made in respect of different values of said focusing current, while all the other welding parameters remain constant. The tests carried out have shown that the maximum and minimum values of the curves correspond to characteristic dimensions of the welds. It must be pointed out that the curve $I_p=f(I_f)$ which is plotted point by point practically coincides with the curve which is obtained by varying $I_f$ continuously, provided that the rate of variation of the focusing current is low.

Figure 5:
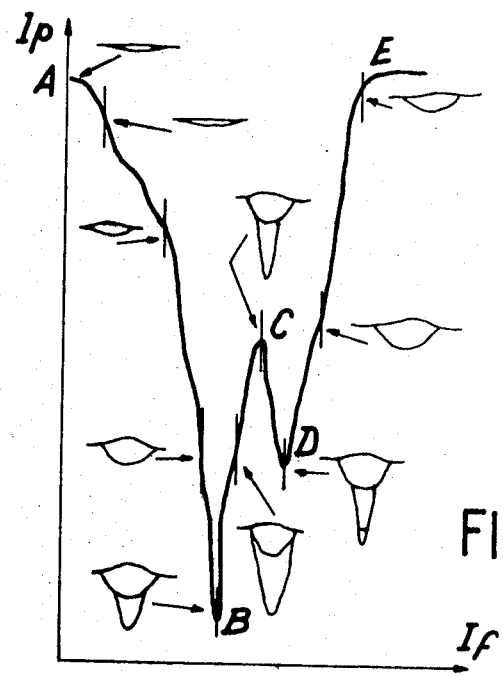
FIG. 5 is a curve which is similar to that of FIG. 3 but in which are shown diagrammatically the cross sections of welds obtained in the case of different focusing adjustments.

FIG. 5 shows the curve $I_p=f(I_f)$ which is obtained in the case of a continuous and slow variation of the focusing current, the target being formed of mild steel; there are shown diagrammatically in this figure the cross sections of welds obtained in respect of different focusing adjustments.

As a first approximation, the results are as follows:

1. on the arms AB and DE of the curve, the melting of the target metal takes place by conduction and the width of the molten zone is the same as its depth. On the arms BC and CD, the molten zone has the shape of a nail; beyond the point A and beyond the point E, the depth of the molten zone is negligible.

2. The weld which has the greatest depth is obtained in the case of the focusing which corresponds to the point C (this applies, for example, to the case of welding of pinions).

3. On the arm CD, the depth of the welds varies considerably and blowholes are visible. The most uniform welds are obtained on the arm BC.

4. The shape of the curves varies with the atomic number of the target, so that the curves and the shapes of welds must be compared at least once in the case of each metal or alloy, correlations being then established.

The method according to the present invention has the advantage of being immediate and not dependent on the skill of the experimenter or on the welding parameters. The accuracy of measurements is always greater than ±1 percent.

The different parameters of the beam such as the intensity of bombardment, the electron acceleration voltage, the distances between the electron gun and the target and so forth have an influence on the shape of the curve produced by the recorder 5 or on the position of the peaks but in practice the action of these parameters becomes apparent only in respect of substantial variations (accidental errors, incidents of operation and the like).

The method according to this invention permits immediate indication of accidental and substantial variations in a welding parameter (there is either displacement of the peaks in the different recordings which are made or a change in the shape of the curve).

The method according to the present invention also permits immediate indication of the ranges of focusing currents which produce a given shape of weld, immediate determination of the focusing which produces the deepest weld in respect of the welding parameters which have been chosen, and immediate indication of the range of focusing current which produces welds having the minimum number of defects and uniform depth.

What is claimed is:

1. A method for compensating for inherent changes in welding conditions with respect to an electron beam welding arrangement including an electron beam source, beam accelerating means responsive to an accelerating voltage for accelerating said beam and a beam focusing arrangement responsive to a focusing current for focusing the beam on a material of selected composition, comprising the steps of adjusted the acceleration voltage of the electrons of the beam, the distance between said electron beam source and said material, and the welding speed to specific values, varying the focusing current of said beam focusing arrangement over a range, measuring the current flowing through said material due to impingement of said beam thereon for each value of focusing current, recording the values of current through said material versus focusing current, at a later time, once again adjusting the acceleration voltage of the electrons of the beam, the distance between said electron beam source and said material of selected composition, and the welding speed to the same specific values as previously used, measuring the current flowing through said material due to impingement of said beam thereon, varying the focusing current of said beam focusing arrangement from the initial value of said range until a peak in said current through said material is reached which corresponds to a peak in the previously recorded values of current through said material versus focusing current, and then further adjusting the focusing current by an amount equal to the difference between the recorded current through said material at the initial value of said range and the newly measured current through said material at the initial value of said range.

2. A method as defined in claim 1, wherein said first steps of varying and measuring are performed in a continuous basis at a low speed.

* * * * *